United States Patent
Van Bogaert et al.

(10) Patent No.: US 9,143,427 B2
(45) Date of Patent: Sep. 22, 2015

(54) FORWARDING A PACKET IN A SENSOR PERSONAL AREA NETWORK

(75) Inventors: Bruno Van Bogaert, Schaarbeek (BE); Werner Liekens, Sint Katelijne Waver (BE); Tom Van Leeuwen, Wondelgem (BE); Willem Acke, Bonheiden (BE)

(73) Assignee: Alcatel Lucent, Boulogne-Billancourt (FR)

( * ) Notice: Subject to any disclaimer, the term of this patent is extended or adjusted under 35 U.S.C. 154(b) by 549 days.

(21) Appl. No.: 13/509,541

(22) PCT Filed: Dec. 7, 2010

(86) PCT No.: PCT/EP2010/069048
§ 371 (c)(1),
(2), (4) Date: Jun. 8, 2012

(87) PCT Pub. No.: WO2011/070000
PCT Pub. Date: Jun. 16, 2011

(65) Prior Publication Data
US 2012/0257555 A1   Oct. 11, 2012

(30) Foreign Application Priority Data
Dec. 10, 2009   (EP) .................... 09290928

(51) Int. Cl.
*H04L 12/701* (2013.01)
*H04L 12/723* (2013.01)
*H04W 28/06* (2009.01)
*H04W 84/18* (2009.01)

(52) U.S. Cl.
CPC ............ *H04L 45/00* (2013.01); *H04L 45/50* (2013.01); *H04W 28/06* (2013.01); *H04W 84/18* (2013.01)

(58) Field of Classification Search
None
See application file for complete search history.

(56) References Cited

U.S. PATENT DOCUMENTS

2005/0041660 A1* 2/2005 Pennec et al. ............... 370/389
2007/0002850 A1* 1/2007 Guichard et al. ........... 370/389

(Continued)

FOREIGN PATENT DOCUMENTS

WO   WO-2005119978 A1   12/2005

OTHER PUBLICATIONS

Ludovici, Alessandro et al. "Implementation and Evaluation of te Enhanced Header Compression (IPHC) for 6LoWPAN" Sep. 7, 2009, The Internet of the Future, Springer Berlin Heidelberg, Berlin, Heidelberg, pp. 168-177, XP019126502, ISBN: 9783642036996.

*Primary Examiner* — Chirag Shah
*Assistant Examiner* — Joshua Smith
(74) *Attorney, Agent, or Firm* — Harness, Dickey & Pierce, P.L.C.

(57) ABSTRACT

The method to forward a packet according to predefined protocol steps applies to a sensor personal area network that includes data communication sensor devices. The method includes assigning a predefined compression value to a compression field in the packet for indicating that a source network identifier of the originator of the packet is assumed to be equal to a destination network identifier of an intended recipient of the packet. Furthermore, the method includes assigning a predefined label switching value lsv to an addressing mode field DAM-F in the packet P for indicating that the above mentioned protocol steps further include a label switching principle that must be applied to forward the packet. Finally the method includes using a source network identifier field SNI-F of the packet for storing and retrieving the label value lab1 for application of the label switching principle based thereon.

9 Claims, 2 Drawing Sheets

(56) References Cited

U.S. PATENT DOCUMENTS

Figure 1:
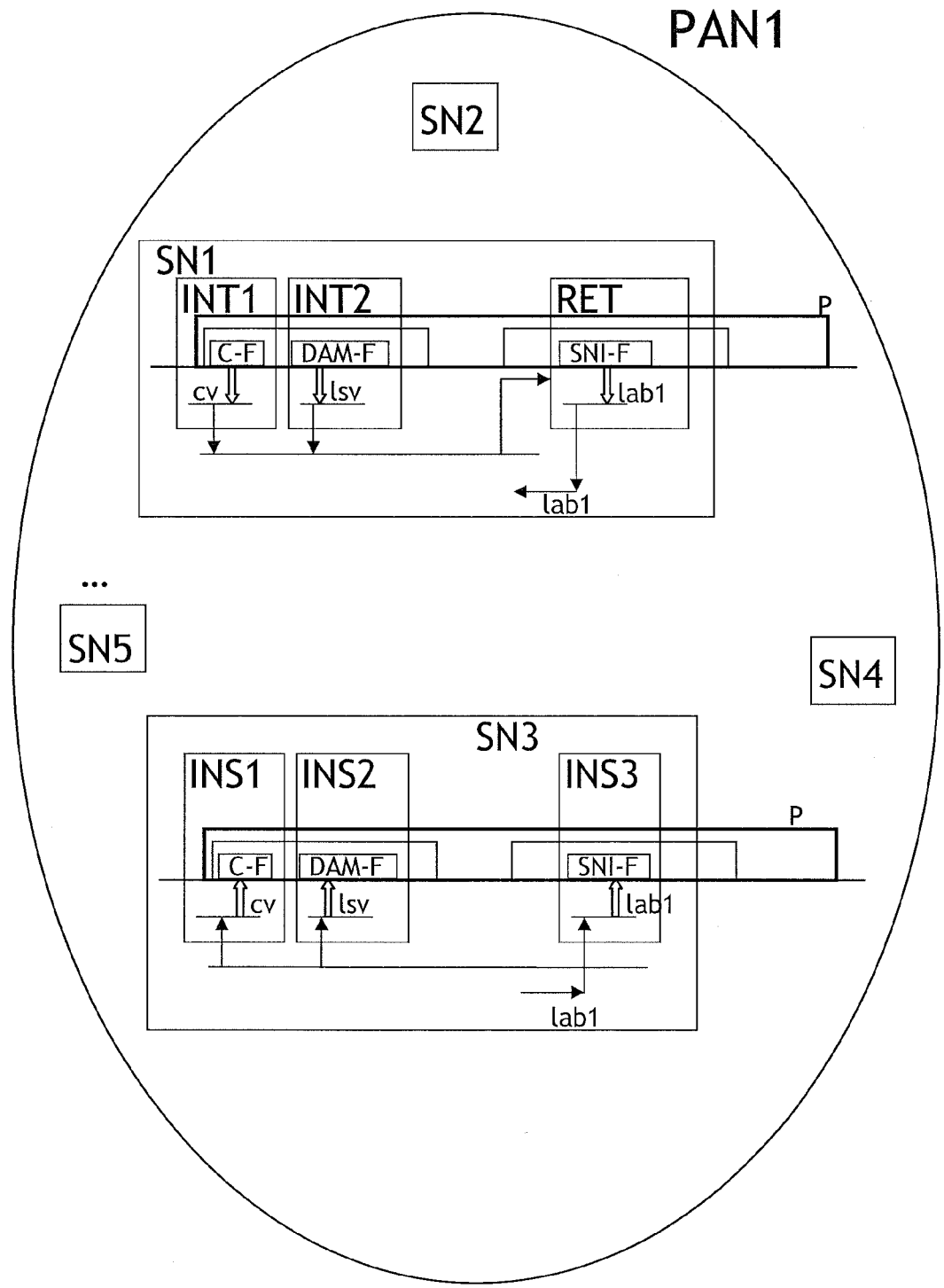

| | | | |
|---|---|---|---|
| 2007/0064675 A1* | 3/2007 | Szucs | 370/352 |
| 2008/0259902 A1* | 10/2008 | Park | 370/349 |
| 2009/0316628 A1* | 12/2009 | Enns et al. | 370/328 |
| 2012/0163362 A1* | 6/2012 | Noh et al. | 370/338 |

* cited by examiner

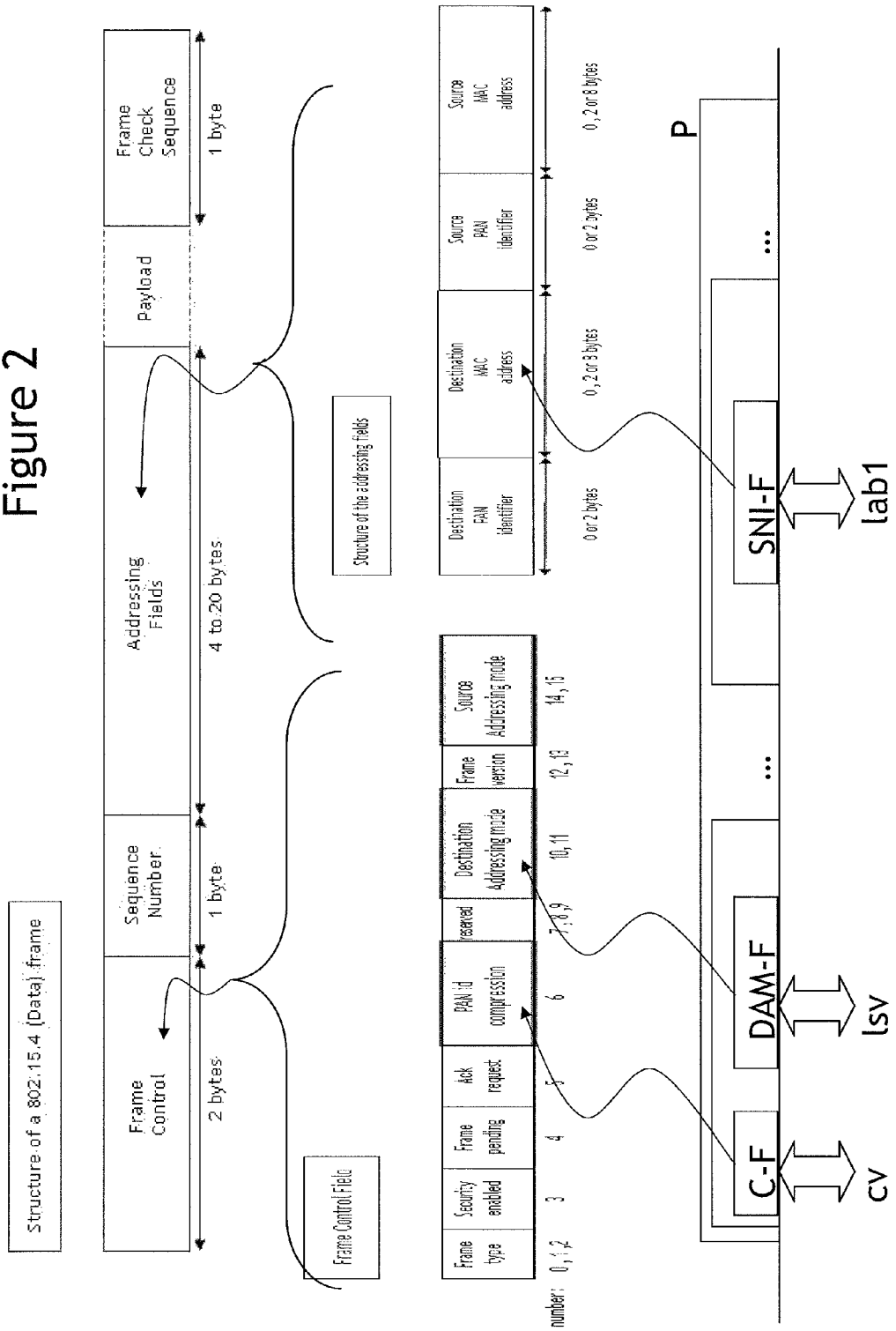

FORWARDING A PACKET IN A SENSOR PERSONAL AREA NETWORK

The present invention relates to a method to forward a packet according to predefined protocol steps in a sensor personal area network that comprises data communication sensor devices and to related sensor nodes to execute the method.

Such methods and related sensor nodes are already known in the art e.g. from IEEE Standard 802.15.4-2003 and IEEE Standard 802.15.4-2006 that defines Medium Access Control and Physical Layer Specifications for compatible interconnection for data communication devices in a personal area network. In this standard the physical layer and the Media Access Control Layer is specified for low power low bandwidth networks.

One of the known steps in such a method to forward a packet is a step of assigning a predefined compression value to a compression field in the packet for indicating that a source network identifier of the originator or originating node of the packet is assumed to be equal to a destination network identifier of an intended recipient of the packet. This is described e.g. in paragraph 7.2.1 General MAC frame format of the above mentioned standard and more particular in paragraph 7.2.1.1.5 PAN ID Compression subfield. Herein it is described that the personal area network, identifier compression subfield, or shortly PAN ID Compression subfield, is 1 bit in length and specifies whether the MAC frame is to be sent containing only one of the personal area network PAN identifier fields when both source and destination PAN identifier addresses are present. If this subfield is set to one and both the source and destination PAN identifier addresses are present, the frame shall contain only the Destination PAN Identifier field, and the Source PAN Identifier field shall be assumed equal to that of the destination and can thereby be omitted. So, this step needs to be applied when forwarding a packet to a node that belongs to a same personal area network.

Furthermore, it is to be explained that this standard is a basis for e.g. Zigbee, which is a specification for a suite of high level communication protocols using small, low-power sensor nodes. The technology defined by the ZigBee specification is intended to be simple and not expensive and targets radio-frequency applications that require a low data rate, long battery life, and secure networking. Another example that uses the 802.15.4 Standard is SUN with the SunSpot networks.

Both technologies use a layer three protocol to ensure the communication in a sensor network. The routing tables in these two solutions are populated with knowledge about the network obtained from a routing protocol such as e.g. Ad-hoc On-demand Distance Vector—AODV.

Furthermore 6 lowpan, which is an acronym of IPv6 over Low power Wireless Personal Area Networks, or IPv6 over LoW Power wireless Area Networks, defines encapsulation and header compression mechanisms that allow IPv6 packets to be sent to and received from over IEEE 802.15.4 based networks. So, 6 LowPan in combination with IEEE Routing Over Lossy and Low-power links protocol—shortly called IEEE ROLL is another layer three protocol that allows the transmission of IPv6 packets over 802.15.4 networks.

A sensor node in a sensor network can as such be implemented by means of a device containing an implementation of the IEEE 802.15.4 medium access control and physical interface to the wireless medium. Such a sensor node may be a reduced-function device or a full function device. Most sensor nodes, especially the reduced-function nodes usually only have low processing power and do have small batteries. However, the above described methods to forward a packet in a sensor personal area network that comprises data communication sensor devices do not always comply with these requirements.

An object of the present invention is to provide a method and related sensor nodes to forward a packet in such a sensor personal area network that requires only reduced processing power since the forwarding requires only processing at layer 2.

When assigning a predefined compression value to a compression field in the packet for indicating that a source network identifier of the originator of the packet is being assumed equal to a destination network identifier of an intended recipient of the packet, the method applies the principle steps of assigning a predefined label switching value to an addressing mode field in the packet for indicating that the protocol steps further comprises a label switching principle that must be applied to forward the packet; and using a source network identifier field of the packet for storing and retrieving a label value for application of the label switching principle based thereon.

In this way a sensor node that receives the packet only needs to read the header of the incoming frame of the incoming packet. After "learning", through the value in the compression field and in addition through the value in the addressing mode field, that the label switching principle needs to be applied, the node knows that the source network identifier field is not empty and that the value which it contains needs to be seen as the required label.

Hereby the node doesn't needs to dig deeper into the payload of the frame and processing power is saved.

Moreover this principle is applied without adding extra overhead to the packets. Indeed, in the event when labels would need to be written within the payload of an IEEE 802.15.4 packet and if the labels are e.g. 2 bytes long (as suggested in a later described embodiment) the advantage of the present application is at least 1.57% more room in the payload for data since the maximum length of the payload of a 802.15.4 frame is 127 bytes.

Packets belonging to the same network are forwarded according to a label switching principle. According to a label switching principle, all packets that belong to a same flow are forwarded over a same path which is set up before the first packet of the flow is being transmitted. Nodes that are contributing to the realization of such a path i.e. source, intermediate and destination nodes, are using a 'label' which is transmitted within the packet in order to identify to which flow the packet belongs. Based on such a label a node will be able to look up in his switching table what to do with the packet. Either this node is the end of the path, or the node is an intermediate node. In the latter case the switching table refers to the next hop to which the packet needs to be transmitted and the label which the packet needs to be configured with.

It has to be remarked that the label for the outgoing packet does not need to be the same one as the label of the incoming packet.

Furthermore, it has to be remarked that label switching forwarding as such is a know principle from e.g. Multiprotocol Label Switching MPLS being used over wired networks. However, the difference here is that firstly, an indication is used to make the sensor node clear that the label switching principle needs indeed to be applied and secondly that the label is to be found in a source network identifier field of the control frame i.e. label switching on layer 2 level.

Also IPv6, as a routing protocol, allows the use of a 'label' in it's header to forward packets belonging to a flow, but this technology demands also the handling of packets on layer 3, while the present solution does not need to look deeper than into some fields of the header of the packet. This makes the present solution also faster in it's forwarding process.

Indeed, a method to forward a packet according to predefined protocol steps in a sensor personal area network comprising data communication sensor devices comprises the steps of
by an originating node of the packet to be forwarded:
inserting with a first inserter (INS1) a predefined compression value in a compression field of the packet and indicating thereby that a source network identifier of the originating node is assumed to be equal to a destination network identifier of an intended recipient of the packet; and
inserting with a second inserter a predefined label switching value in an addressing mode field in the packet and thereby indicating to the actual sensor node that the actual protocol steps comprises a label switching principle that should be applied to forward the present packet; and
inserting with a third inserter a label value in a source network identifier field in the packet; and furthermore
by an intermediate node of the packet to be forwarded:
interpreting with a first interpreter the predefined compression value in the compression field and thereby determining that the source network identifier of the originating node of the packet is assumed to be equal to a destination network identifier of an intended recipient of said packet; and
interpreting with a second interpreter the predefined label switching value in the addressing mode field and thereby determining that the actual protocol steps comprises a label switching principle which must be applied for forwarding the packet, and upon establishment of such an interpretation, accordingly triggering a retriever; and
retrieving with the retriever the label value from the source network identifier field, whereby the label value needs to be used by the intermediate node for forwarding the actual packet according to the label switching principle.

As mentioned before, a suitable implementation for the predefined protocol steps are described according to the IEEE Standard 802.15.4 that defines Medium Access Control and Physical Layer Specifications for compatible interconnection for data communication devices in a personal area network. It has to be clear that although as a basis the predefined protocol steps of IEEE Standard 802.15.4 can be use, by applying the basic idea of the present invention, these protocol steps as are extended with the additional steps described here above.

As mentioned above, a suitable field for implementing the compression field is a PAN ID Compression subfield of a Frame control field according to an IEEE Standard with reference 802.15.4 and which defines Medium Access Control and Physical Layer Specifications for compatible interconnection for data communication devices in a personal area network.

When each independent Personal Area Network selects a unique identifier, the PAN identifier allows communication between sensor within a network by using short addresses but enables also transmission between devices across independent networks. The PAN ID Compression subfield of the 802.15.4 standard is only 1 bit long and specifies whether the MAC frame is to be sent containing only one of the PAN identifier fields in the event when both source and destination PAN identifier addresses are present. In the event when this subfield is set to one and both the source and destination PAN identifier addresses are present, the frame shall contain only the Destination PAN Identifier field, and the Source PAN Identifier field shall be assumed equal to that of the destination.

A possible implementation of the addressing mode field is by means of a destination addressing mode field.

Furthermore by constituting such a destination addressing mode field with a destination addressing mode field of a Frame Control field according to the IEEE Standard with reference 802.15.4 a convenient implementation is realized.

In a further implementation the destination addressing mode field is defined two bits long and whereby the assigned predefined label switching value is for the first bit equal to zero and for the second bit equal to one. It has to be remarked that according to the present versions of the IEEE 802.15.4 Standard this value for the destination addressing mode field is a reserved value which in principle might not be used. This means that the above described implementation requires a release of this reserved value.

In an implementation the source network identifier field may be constituted by a Source PAN Identifier field of a Frame control field according to the IEEE Standard with reference 802.15.4. This Source PAN Identifier field, when present, is 2 octets long and specifies normally the unique PAN identifier of the originator of the frame. According to the known IEEE 802.15.4. Standard implementation, the Source PAN identifier is only present when the PAN id compression is equal to the predefined value "zero". According to the present application, this field can also be included in the MAC frame when the PAN ID Compression subfield is "nonzero".

The above and other objects and features of the invention will become more apparent and the invention itself will be best understood by referring to the following description of an embodiment taken in conjunction with the accompanying drawings wherein FIG. 1 represents a personal area network with sensor nodes and FIG. 2 represents a structure of a packet.

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Similarly, it is to be noticed that the term 'coupled' should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

The working of the device according to the present invention in accordance with its telecommunication environment that is shown in FIG. 1 will be explained by means of a functional description of the different blocks shown therein. Based on this description, the practical implementation of the blocks will be obvious to a person skilled in the art and will therefor not be described in details. In addition, the principle working of the method to forward a packet in a sensor personal area network will be described in further detail.

Referring to FIG. 1 a Personal Area Network PAN1 is shown. The Personal Area Network comprises sensor nodes whereof SN1, SN2, SN3, SN4 and SN5 are shown as an example. In order not to overload FIG. 1 only in Sensor node SN1 and SN3 more details are shown. In sensor node SN3 the relevant functional blocks of an originating node are shown and in sensor node SN1 the relevant blocks of an intermediate or receiving node are shown.

The mentioned different functional blocks of sensor node 1 are each coupled to an input interface and the mentioned functional blocks of an originating node are each coupled to an output interface of the node. All these functional blocks are enabled to insert or store, to retrieve and to interpret the bits and bytes of incoming or leaving packet such as packet P.

It has to be remarked here that the different functional blocks of e.g. the described originating sensor such as SN3 are not limited to be only comprised in such an originating sensor. Indeed, a sensor might as well comprise the functional blocks that are here described for the originating node SN3 as the functional blocks that are here described for the intermediate/receiving node SN1/SN5 in order to respectively transmit, forward or receive a packet.

Looking to sensor node SN1, a first interpreter INT1, a second interpreter INT2 and a retriever RET are shown. The three functional blocks are coupled to an input interface of sensor node SN1. The first interpreter INT1 is an interpreter means that is enabled to interprets a predefined compression value cv in a compression field C-F in the packet P and to determine thereby that a source network identifier of an originator of the packet e.g. SN3 is assumed to be equal to a destination network identifier of an intended recipient e.g. SN5 of the packet P. The second interpreter INT2 is an interpreting means which is enabled to interpret a predefined label switching value Isv in an addressing mode field DAM-F of the packet P. Upon interpretation of the value in the addressing mode field DAM-F and determination that it is indeed the predefined label switching value Isv, the second interpreter shall accordingly trigger the retriever RET. The retriever RET is a retriever means which is enabled to retrieve, upon reception of a trigger of the second interpreter INT2, a label value lab1 from a source network identifier field SNI-F in the packet. As will be explained hereafter, this label value lab1 is the value of a label that should be used by the sensor node SN1 to forward the packet P according to the label switching principle.

Looking to sensor node SN3, a first inserter INS1, a second inserter INS2 and a third inserter INS3 are shown. The three functional blocks are coupled to an output interface of sensor node SN3. The first inserter INS1, is an inserting means that is enabled to insert a predefined compression value cv in a compression field C-F of packet P that is prepared to be transmitted. The second inserter INS2, is an inserting means that is enabled to insert a predefined label switching value Isv in an addressing mode field DAM-F of that packet P. The third inserter INS3, is an inserting means that is enabled to insert a label value lab1 in a source network identifier field SNI-F in the packet.

Referring to FIG. 2 convenient mapping to the known IEEE Standard with reference 802.15.4 will be explained. On top of FIG. 2, in the first row, a frame structure according to an IEEE Standard with reference 802.15.4 is shown: a Frame Control field of 2 bytes, a Sequence number of 1 byte, an addressing Field of to 20 bytes, a payload and a Frame Check Sequence of 1 byte is shown.

In the second row, the Frame Control Field and the Addressing Fields are shown in more details. In this way, the Frame Control Field shows A Frame Type (bit 1, 2, 3), a Security enabled bit (bit 4), a Frame Pending bit (bit 5), an Ack Request bit (bit 5), a PAN id Compression Field (bit 6), Reserved bits (bits 7, 8 and 9), Destination addressing mode bits (bits 10, 11), Frame version bits (bits 12 and 13) and Source Addressing mode bits (bits 14 and 15). The Structure of the addressing field shows a Destination PAN Identifier Field (0 or 2 bytes), Destination MAC address field (0, 2 or 8 bytes), a Source PAN identifier field (0 or 2 bytes) and a Source MAC address field (0, 2 or 8 bytes). A convenient implementation of the defined fields of the present applications by means of an IEEE Standard with reference 802.15.4 are made clear by means of an arrow from the third row in FIG. 2 towards the second row. In this way is a convenient implementation for the Compression Field of the present application the PAN id Compression field of an IEEE Standard with reference 802.15.4 i.e. bit 6 of the Frame Control Field. In a similar way is the Destination addressing mode field of the Frame Control Field of an IEEE Standard with reference 802.15.4 a convenient implementation for the Addressing Mode field of the present application. Furthermore can the Source Network Identifier field be implemented by means of the Source PAN Identifier field of an IEEE Standard with reference 802.15.4. It has to be remarked here that although actual known fields of an IEEE Standard with reference 802.15.4 can be re-used in the packet, the actual known values or newly defined values for the different fields are getting different or additional meanings to be respected according to the designed functional blocks. This will become clearer in the following paragraphs.

Referring to the Compression Field C-F of a packet P, and according to the known specifications, bit 6 tells, in the event when it is set to 1, that the Destination PAN identification of the receiving node intended to receive the packet is the same as the Source PAN identification of the Source node i.e. originating sensor node. In that case the Source PAN identification might be omitted according to these known specifications. This means that the Source Network Identifier Field does in fact not exist. Furthermore, referring to the addressing mode field DAM-F, the bits 10 and 11 can have the following values:

00 Destination PAN id and destination address are not present

10 Destination address uses 16 bits notation

11 Destination address uses 64 bits notation

According to the present application these rules are extended with the following principles. Firstly an additional value for the addressing mode field is defined i.e. bits 10 and 11 might as well get a predefined value called "label switching value". According to the above implementation according to IEEE Standard with reference 802.15.4 only the value "01" is left for these two bits. So, according to this described implementation the predefined "label switching value" receives the actual value "01".

Now, according to the present application, in the event when:

bit number 6 of the Compression Field is indeed set to the compression value cv i.e. "1"; and when bits number 10 and 11 of the Addressing Mode Field in the Frame Control field do have the newly defined label switching value Isv i.e. "01", the newly defined and implemented rule in the sensor nodes is that the Source Network Identifier field SNI-F should not be omitted but must, to the contrary of the known rules, be checked upon its value i.e. the Source Network Identifier Field does exist and a certain value is included a that place of the field in the packet. This value is called, the label value lab1. And this label value lab1 needs to be used to forward the packet according to a label switching principle.

It has to be remarked here that in the present application the structure of the label is not described in detail since this goes beyond the aim of the present application. The aim of the present application is to include in the packet P a label on the level of the packet header whereby the principle of label switching can be applied without having the different sensor nodes to execute deep processing of the packet to find the required label i.e. without having to look into the payload field of the packet P. The two bytes of the label can e.g. be used to contain a 1 byte label value and a 1 byte TTL "Time To Live". Alternatively, the two bytes could be used to carry a label within a label i.e. called "label stacking" or some bits can be used to carry QoS information.

A further advantage of the application of label switching for the forwarding of a packet in a sensor personal area network is the flexibility to manually influence the path of the packet P to be taken. Indeed, as described above, according to label switching principle the respective value for the labels is kept in forwarding tables which needs to be checked by the sensor devices to learn whereto the packet P needs to be forwarded. These forwarding tables can manually adjusted whereby the route of a packet can be influenced to pass e.g. sensor devices with more processing power.

The working of the sensor devices according to the present invention in accordance with its telecommunication environment that is shown in FIG. 1 will now be explained by means of a functional description of the different blocks shown therein.

Presume that a packet is to be transmitted by originating node SN3 via intermediate sensor node SN1 towards the receiving node SN5. All nodes are part of the same sensor personal area network PAN1.

The method according to the present application comprises therefore the following steps. At sensor device SN3, the header of the packet P is constructed in order to prepare the complete packet P for forwarding towards the next sensor device SN1. The sensor device SN3 executes the following steps:

inserting with the first inserter INS1 of SN3 the predefined compression value cv such as "1" in the compression field C-F of constructed packet P and indicating thereby that a source network identifier of the originating node SN3 is indeed assumed equal to a destination network identifier of the intended recipient i.e. SN5 of the packet P; and inserting with a second inserter INS2 of SN3 a predefined label switching value Isv such as "01" in the addressing mode field DAM-F in the packet P and thereby indicating that the protocol steps to forward the packet comprises a label switching principle which must be applied to forward or to finally receive the packet P; and inserting with a third inserter INS3 of SN3 a label value lab1 in a source network identifier field SNI-F in the packet. It has to be remarked that this lab1 value is predetermined according to label switching forwarding principles. This first label value lab1 is the value that will instruct the first following sensor device on the way of the packet, according to its forwarding table, to take the right actions to forward the packet towards the next sensor device. After executing these previous steps the sensor device SN3 transmits the packet P towards sensor device SN1. Upon reception of the packet P, sensor device SN1 executes the following steps:

interpreting with a first interpreter INT1 of SN1 the predefined compression value cv "1" in the compression field C-F and thereby indeed determining that the source network identifier of the originating node SN3 of the packet P is indeed equal to the destination network identifier of the intended recipient of the packet SN5; and interpreting with a second interpreter INT2 of SN1 the predefined label switching value Isv "01" in the addressing mode field DAM-F and thereby determining that the protocol steps comprises a label switching principle that must be applied for forwarding the packet P, and accordingly thereby triggering the retriever RET; and retrieving with the retriever RET the label value lab1 from the source network identifier field SNI-F. This label value lab1 is used by the intermediate node SN1 to forward the packet according to the label switching principle.

It is shortly mentioned here that the value of lab1 might remain the same value lab1 or might as well be replaced with another label value e.g. lab2. This is dependent of the forwarding table and instructions of the label switching specification. In this way the packet P is forwarded by the sensor device SN1 towards sensor device SN5. Upon reception of the packet P, sensor device SN5 executes similar steps as being executed by sensor device SN1. However, upon determination of the actual included label value and consulting of its label switching forwarding table the Sensor device SN5 learns that packet P reached its destination.

A final remark is that embodiments of the present invention are described above in terms of functional blocks. From the functional description of these blocks, given above, it will be apparent for a person skilled in the art of designing electronic devices how embodiments of these blocks can be manufactured with well-known electronic components. A detailed architecture of the contents of the functional blocks hence is not given.

While the principles of the invention have been described above in connection with specific apparatus, it is to be clearly understood that this description is made only by way of example and not as a limitation on the scope of the invention, as defined in the appended claims.

The invention claimed is:

1. A method of forwarding a packet according to a protocol, the packet being forwarded over a flow from an originator to an intended recipient in a sensor personal network including data communication sensor devices, said method comprising:
    assigning a compression value to a compression field in said packet, the compression value indicating that both the originator and the intended recipient are associated with a same sensor personal area network such that a source network identifier of the originator of said packet is equal to a destination network identifier of the intended recipient of said packet,
    assigning a label switching value to a destination addressing mode field in said packet, the label switching value indicating that a label switching principle must be applied to forward said packet by assigning a value to the destination addressing mode field that is undefined in a standard associated with the destination addressing mode field, the standard defining Medium Access Control and Physical Layer Specifications for compatible interconnection of devices in a personal area network;
    using a source network identifier field of said packet for storing and retrieving a label value for application of said label switching principle based thereon even though the compression field indicates that the source network identifier is equal to the destination network identifier, the label value being determined at the data link layer in an open systems interconnection (OCI) model, the label value being used in conjunction with a switching table to determine a next hop of the flow; and
    forwarding the packet to the determined next hop of the flow towards the intended recipient.

2. The method according to claim 1, wherein said protocol is described according to an IEEE Standard with reference 802.15.4 that defines Medium Access Control and Physical Layer Specifications for compatible interconnection for data communication devices in a personal area network.

3. The method according to claim 1, further comprising:
constituting said compression field by a PAN ID Compression subfield of a Frame control field according to according an IEEE Standard with reference 802.15.4 that defines Medium Access Control and Physical Layer Specifications for compatible interconnection for data communication devices in a personal area network.

4. The method according to claim 1, wherein the destination addressing mode field of a Frame control field is defined according to an IEEE Standard with reference 802.15.4.

5. The method according to claim 4, further comprising:
defining said destination addressing mode field two bits long and assigning to said predefined label switching value first bit equal to zero and a second bit equal to one.

6. The method according to claim 1, comprising:
constituting said source network identifier field by a Source PAN Identifier field of a Frame control field according to an IEEE Standard with reference 802.15.4 that defines Medium Access Control and Physical Layer Specifications for compatible interconnection for data communication devices in a personal area network.

7. A method of forwarding a packet according to a protocol, the packet being forwarded over a flow from an originator to an intended recipient in a sensor personal network including data communication sensor devices, said method comprising:
receiving the packet, the packet including a compression field containing compression value therein, a destination addressing mode field including a label switching value therein and a source network identifier field including a label value therein;
interpreting the compression value in said compression field to determine if both the originator and the intended recipient are associated with a same sensor personal area network such that said source network identifier of said originating node of said packet is equal to a destination network identifier of the intended recipient of said packet; and
interpreting the label switching value in said destination addressing mode field to determine whether to apply a label switching principle when forwarding said packet by evaluating whether a value of the destination addressing mode field is undefined in a standard associated with the destination addressing mode field, the standard defining Medium Access Control and Physical Layer Specifications for compatible interconnection of devices in a personal area network;
retrieving said label value from said source network identifier field even though the compression field indicates that the source network identifier is equal to the destination network identifier, the label value being determined at the data link layer in an open systems interconnection (OCI) model, the label value being used in conjunction with a switching table to determine a next hop of the flow; and
forwarding the packet to the determined next hop of the flow towards the intended recipient.

8. A sensor node configured to forward a packet according to a protocol, the packet being forwarded over a flow from an originator to an intended recipient in a sensor personal network including data communication sensor devices, said sensor node comprising:
a receiver configured to receive the packet, the packet including a compression field containing compression value therein, a destination addressing mode field including a label switching value therein and a source network identifier field including a label value therein; and
a processor configured to,
interpret the compression value in said compression field to determine if both the originator and the intended recipient are associated with a same sensor personal area network such that a source network identifier of the originator of said packet is equal to a destination network identifier of the intended recipient of said packet,
interpret the label switching value in said destination addressing mode field to determine whether to apply a label switching by evaluating whether a value of the destination addressing mode field is undefined in a standard associated with the destination addressing mode field, the standard defining Medium Access Control and Physical Layer Specifications for compatible interconnection of devices in a personal area network,
retrieve said label value from a source network identifier field even though the compression field indicates that the source network identifier is equal to the destination network identifier, the label value being determined at the data link layer in an open systems interconnection (OCI) model, the label value being used in conjunction with a switching table to determine a next hop of the flow; and
forward the packet to the determined next hop of the flow towards the intended recipient.

9. An originating sensor node configured to forward a packet according to a protocol, the packet being forwarded over a flow from the originating sensor node to an intended recipient in a sensor personal network including data communication sensor devices, said sensor node comprising:
a memory and a processor, the memory containing computer readable code that, when executed by the processor, configures the processor to,
assign a compression value to a compression field in said packet, the compression value indicating that both the originating sensor node and the intended recipient are associated with a same sensor personal area network such that a source network identifier of said originating sensor node of said packet is equal to a destination network identifier of the intended recipient of said packet,
assign a label switching value in a a destination addressing mode field in said packet, the label switching value indicating that a label switching principle must be applied to forward said packet by assigning a value to the destination addressing mode field that is undefined in a standard associated with the destination addressing mode field, the standard defining Medium Access Control and Physical Layer Specifications for compatible interconnection of devices in a personal area network;
insert a label value in a source network identifier field in said packet, said label value indicating that an intermediate sensor node must apply said label switching principle to forward said packet by determining the label value at the data link layer in an open system interconnection (OCI) model even though the compression field indicates that the source network identifier is equal to the destination network identifier and using the determined label value in conjunction with a switching table to determine a next hop of the flow; and
forward the packet to the determined next hop of the flow towards the intended recipient.

* * * * *